Figure 7:
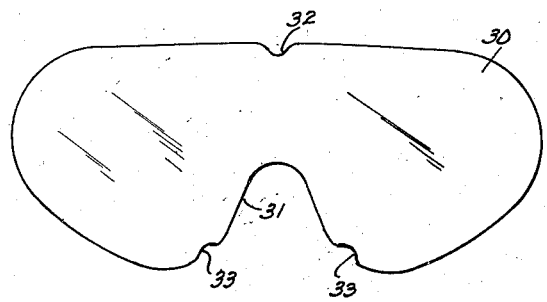

July 27, 1948.  D. E. KIMBALL  2,446,048
EYESHIELD
Filed July 20, 1945  2 Sheets-Sheet 1
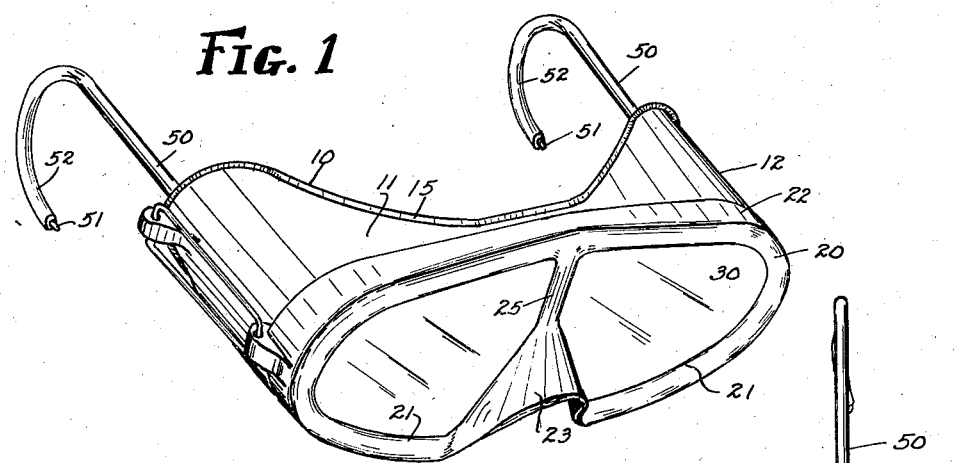
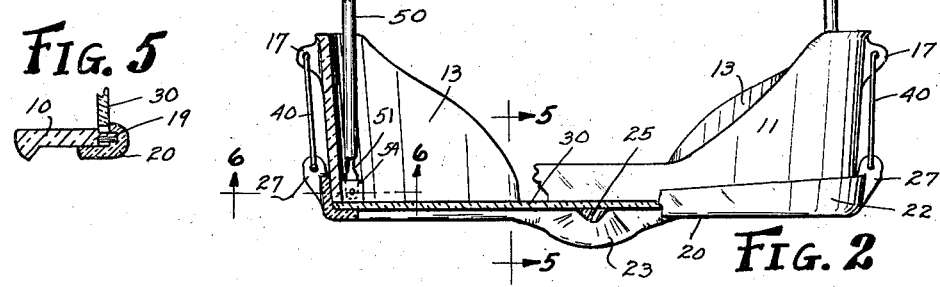
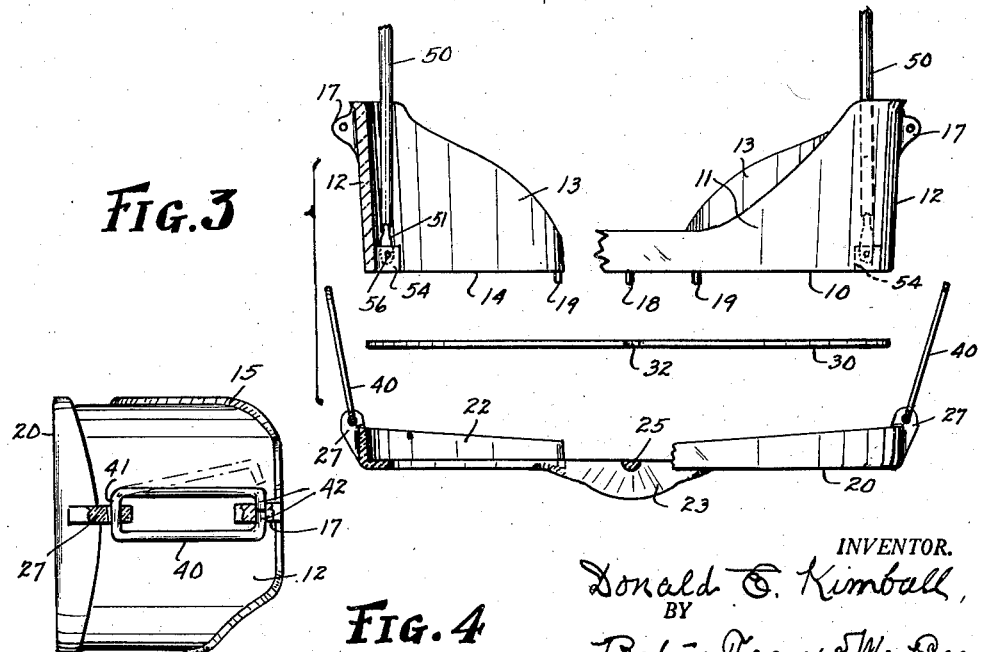
INVENTOR.
Donald E. Kimball,
BY
Bates, Teare & McBean,
Attorneys.

July 27, 1948.　　　D. E. KIMBALL　　　2,446,048
EYESHIELD

Filed July 20, 1945　　　　　　　　　2 Sheets-Sheet 2

INVENTOR.
Donald E. Kimball,
BY
Bates, Teare & McBean,
Attorneys.

Patented July 27, 1948

2,446,048

UNITED STATES PATENT OFFICE 2,446,048

EYESHIELD

Donald E. Kimball, Cleveland Heights, Ohio

Application July 20, 1945, Serial No. 606,181

3 Claims. (Cl. 2—14)

This invention relates to an eye shield or goggle adapted to be readily mounted over the user's eyes to protect them, as from particles of material in industry or from the wind or from too intense a light. Such goggles comprise lenses for the front of the eyes, a hood carrying the same extending to the face and suitable means for holding the hood in place. Objects of the invention are to provide for the construction in a very simple and light but comparatively strong form; to enable the ready separation of the lenses from the frame for cleaning or substitution; to provide for the lenses being a single plate of transparent material clamped between a hood and a border member each of which may be readily made of transparent plastic material, and generally to provide a goggle which may be comfortably worn by the user and which will be effective in use.

My eyeshield or goggle is illustrated in a preferred form in the drawings and is hereinafter more fully explained and the essential novel features are summarized in the claims.

Figure 6:
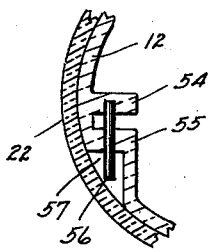
Figure 8:
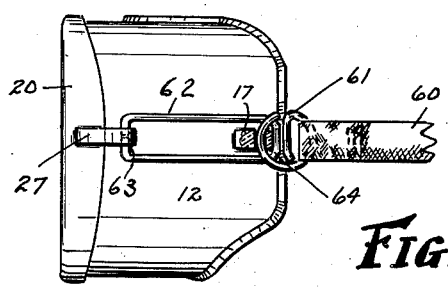

In the drawings, Fig. 1 is a perspective of the goggle; Fig. 2 is a plan, partly in section and partly broken away; Fig. 3 is a separated sectional and broken plan of the two-part frame and a plate constituting the two lenses; Fig. 4 is an end view of the goggle; Fig. 5 is a detail in section on the line 5—5 on Fig. 2; Fig. 6 is a detail in cross section in a plane indicated by the line 6—6 on Fig. 2; Fig. 7 is a view of the lens plate detached; Fig. 8 is an end view of the goggle when provided with an attaching band.

In general my goggle provides a two-part frame 10 and 20 and a continuous lens plate 30 adapted to be clamped to the two parts of the frame. The hood or frame 10 comprises a single piece of transparent plastic material formed to provide a top portion 11, U-shaped end portions 12 and two returning lower or bottom portions 13 separated at their ends. The hood may have its entire front edge 14 lying in a single plane, while its rear edge at the top portion is concaved or recessed as shown at 15 and the bottom portions likewise cut away to enable this edge to comfortably fit the wearer's face. To aid in the comfort of the wearer the entire rear edge is provided with a rounded outwardly extending bead.

The U-shaped end portions of the frame 10 are provided each with a pair of outwardly extending perforated ears 17 for the purpose of attachment of the clamping portion of the frame as hereinafter described. The front edge 14 of the frame 10 is uninterrupted with the exception of a pin 18 extending forwardly from the middle of the top portion and a pair of pins 19 extending forwardly from the bottom portions adjacent their inner edges. These pins coact with the applied border member as hereinafter explained.

The lens plate 30 is shown as a single flat piece of transparent material adapted to rest against the front edge of the frame shown in Fig. 2. It is provided with a recess 31 in its lower portion for the nose of the wearer and has three small notches 32, 33 and 33 to receive the three pins 18, 19 and 19.

The lens plate 30 is normally held against the frame or hood 10 by a retaining or border member 20 which is a loop L-shaped in cross section and thus having a front portion 21 adapted to lie against the face of the lens plate and a rearwardly projecting skirt portion 22 to embrace the frame 10.

At the center of the front the border member is formed with a flaring partially conical portion 23 adapted to fit over the wearer's nose. This portion 23 merges at its two lower corners with the face portion 21 on the opposite sides thereof, and at the apex of the nose portion there is a bead portion 25 continuing upwardly to the face portion of the border member at the top, thus bracing the forwardly bowed nose portion. The face portion 21 is provided with rearwardly open recesses positioned to receive the three pins 18 and 19 of the frame 10. Accordingly when the lens plate is against the frame and the retaining member positioned over the lens plate the three parts form a unitary device.

To hold the retaining member on the frame, thus holding the lens plate in place, I provide a pair of perforated ears 27 at the ends of the retaining member and I mount in these ears wire loops 40 which are adapted to coact with the ears 17 on the frame 10 to hold the parts together.

In the construction shown in Figs. 1 to 4, the wire loop 40 has an intermediate portion freely occupying the opening in the ear 27 and the two arms extending rearwardly and each turned inwardly as at 42. The two inward portions align and when the goggle is assembled occupy the perforation in the frame ear 17 in alignment with each other as shown in Fig. 4. The loop 40 is a resilient material and hence its two arms may be rearwardly spread whenever desired, and when spread the inturned ends 42 become free from the ear 17 and allow the disconnection of the retaining member and the removal of the lens plate. Then in reassembling the parts the free ends of the two loops 40 are sprung apart by the operator's fingers and the free ends 42 inserted in the ears 17, after which their resilience holds them effectively in place, thus maintaining the goggle in assembled condition.

Suitable means are provided for holding the goggle in place on the wearer's face. For this purpose, I may provide a pair of temples 50 (Figs. 1, 2 and 3) each of which is pivoted at its forward end to the inner side of the hood 10 near the front edge, the temples at their rear portion being curved into U-shape to fit over the wearer's ears.

The temples may readily be made of flexible metallic wires indicated at 51 and embraced by a tube 52 of plastic material. By pivotally mounting the temples and attaching them on the inner face of the U-shaped ends of the frame 10 they extend in use rearwardly in a position suitable for comfortable wearing by the user. They may also be folded down into the space within the frame 10 for convenient packing or carrying of the goggle.

The temple is readily pivoted to the frame by having a flattened end mounted between a pair of bosses 54 and 55 (Fig. 6), integral with the end portions 12, and a suitable pin 56 passing vertically through the bosses. This pin has its lower end exposed in an external recess 57 in the U-shaped end of the frame. The pin does not extend beyond the outer periphery of the U-shaped portion but the end of the pin is accessible in the recess so that it may be readily withdrawn by a pair of pliers, thus the temples may be readily attached or removed if desired.

In place of the temples shown in the drawing, one may, if desired, use a strap adapted to pass around the wearer's head, the ends of the strap being secured to the ears 17. Such construction is illustrated in Fig. 8, where 60 indicates the strap and 61 a wire loop attached to the strap and having a free end portion passing through the opening in the ear 17. In this case the wire fastening loop 62 (similar to the loop 40 but slightly longer) has its inturned free ends 63 occupying the ear 27 and its intermediate portion 64 looped around the ear 17 and retained by the overlying fastening 62.

It will be seen therefore that the change from temples to strap as the holding means may be very readily effected. It is simply necessary to withdraw the two pivot pins 56, to substitute the loops 62 for the loops 40 and to pass the fasteners 61 through the ears of the hood ends.

It will be seen that my goggle, which may be readily made of transparent plastic material, is very light and is comfortably worn and may be readily separated to free the parts so that the lens plate and the frame members may be easily cleaned. The separable provision also allows for changing the lens plate; substituting a colored plate, for instance, if desired, for the work in hand. The parts while very light are comparatively strong. The front retaining member is well braced by the bead extending from the nose piece to the upper portion thereof without interfering with the vision. The border member 20 forms a front projection to the lens plate and allows the device to stand lens down on a bench, for instance, without danger of the lenses becoming soiled.

I claim:

1. In a goggle, the combination of a frame having a top portion, end portions and a pair of separated bottom portions, the rear edge of the frame being formed to fit approximately against the face of the wearer, a movable lens plate adapted to bear against the frame at the front, an open retaining member having a contour approximately corresponding to that of the front of the frame, and having a rearward flange adapted to embrace the frame, said retaining member being movable from the frame to allow the ready insertion and removal of the lens plate between them, the retaining member being provided with ears at its ends and loop portions adapted to connect said ears removable to the end portions of the frame.

2. In a goggle, the combination of a frame having a top portion, end portions and a pair of separated bottom portions, the rear edge of the frame being formed to fit approximately against the face of the wearer and the front edge lying substantially in a single plane, a flat lens plate adapted to lie against the front edge of the frame and having a notch on its lower portion for the wearer's nose, a retaining member in the form of a continuous open loop and for the most part having a contour corresponding to the front of the frame, and having a flange to embrace the frame, the retaining member being connected to the frame adjacent the free ends of the separated bottom portions of the frame and having an outwardly bowed portion registering with the notch in the lens plate, and readily releasable means normally connecting opposite ends of the retaining member with the ends of the frame whereby the retaining member may be readily spaced from the frame to allow the insertion and removal of the lens plate.

3. In a goggle, the combination of a frame having a top portion, end portions and a pair of separated bottom portions, the rear edge of the frame being formed to fit approximately against the face of the wearer and the front elge lying substantially in a single plane, a flat lens plate adapted to lie against the front edge of the frame and having a notch on its lower portion for the wearer's nose, a retaining member in the form of a continuous open loop and for the most part having a contour corresponding to the front of the frame and having a flange to embrace the exterior of the frame, said retaining member continuing across the open notch in the lens plate in the form of an outwardly bowed portion registering with said notch, the flange of the body member at opposite ends being provided with perforated ears, and a pair of loop fasteners occupying the perforations and normally extending along the outer side of the end portions of the frame and coacting with outwardly extending ears on such end portions to hold the retaining member in position against the frame with the lens plate clamped between the retaining member and frame, said fasteners being separable from the frame ears whereby the retaining member may be readily spaced from the frame to allow the insertion and removal of the lens plate.

DONALD E. KIMBALL.

REFERENCES CITED

The following references are of record in the file of this patent:

UNITED STATES PATENTS

| Number | Name | Date |
| --- | --- | --- |
| 2,245,990 | Loud | June 17, 1941 |
| 2,263,329 | Bouchard | Nov. 18, 1941 |
| 2,274,791 | Huggins | Mar. 3, 1942 |
| 2,300,365 | Wagner | Oct. 27, 1942 |
| 2,368,303 | Johnston | Jan. 30, 1945 |
| 2,387,522 | Maurer | Oct. 23, 1945 |
| 2,387,821 | Baratelli et al. | Oct. 30, 1945 |
| 2,391,349 | Ring | Dec. 18, 1945 |